United States Patent [19]

Ferrieu

[11] 4,275,277
[45] Jun. 23, 1981

[54] SUBSCRIBER LINE INTERFACE CIRCUIT FOR A TELEPHONE LINE

[75] Inventor: Gilbert M. M. Ferrieu, Bievres, France

[73] Assignee: U.S. Philips Corporation, New York, N.Y.

[21] Appl. No.: 51,084

[22] Filed: Jun. 22, 1979

[30] Foreign Application Priority Data

Jun. 26, 1978 [FR] France .............................. 78 18960
Sep. 28, 1978 [FR] France .............................. 78 27762

[51] Int. Cl.³ .......................... H04B 1/58; H04Q 1/28
[52] U.S. Cl. ........................... 179/170 NC; 179/81 R; 179/170 R
[58] Field of Search ................... 330/257; 179/170 R, 179/170 NC, 170 T, 2 C, 81 R

[56] References Cited

U.S. PATENT DOCUMENTS

| | | | |
|---|---|---|---|
| 3,849,609 | 11/1974 | Voorman | 179/170 NC |
| 4,004,109 | 1/1977 | Boxall | 179/170 NC |
| 4,041,252 | 8/1977 | Cowden | 179/170 NC |
| 4,142,075 | 2/1979 | Olschewski | 179/170 NC |

Primary Examiner—Bernard Konick
Assistant Examiner—Randall P. Myers
Attorney, Agent, or Firm—Thomas A. Briody; William J. Streeter; Laurence A. Wright

[57] ABSTRACT

Subscriber line interface circuit for connecting a subscriber's telephone line to, for example, an automatic telephone exchange comprising a pair of amplifiers whose outputs are connected to the wires of the telephone line and which are fed by a d.c. voltage supply source. This supply source provides the telephone line with direct current via the amplifiers. In practice, the telephone line must be terminated by a symmetrical impedance of a prescribed value. To this end the interface circuit comprises means for determining the weighted sum of the current flowing through one and through the other wire of the telephone line such that the sum current is independent of the longitudinal currents in the telephone line. By means of an impedance, two antiphase feedback voltages are generated at the inputs of the amplifiers, these amplifiers then having a symmetrical impedance at their outputs.

8 Claims, 7 Drawing Figures

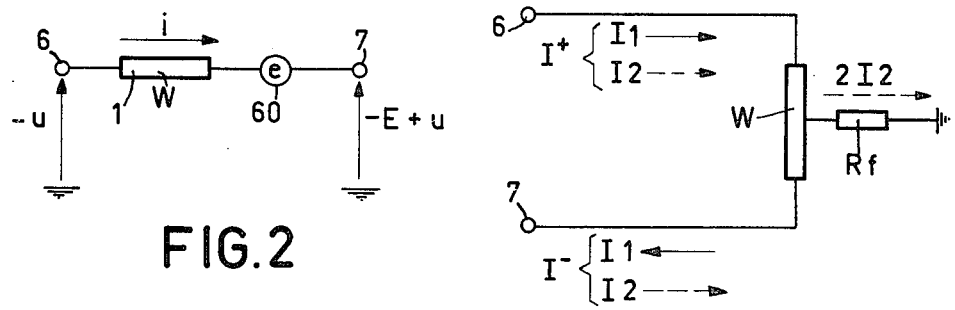
FIG.2
FIG.3
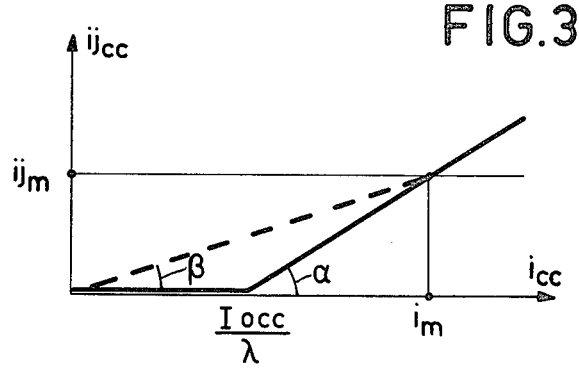
FIG.4
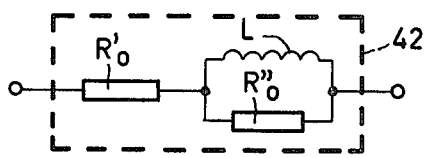
FIG.5
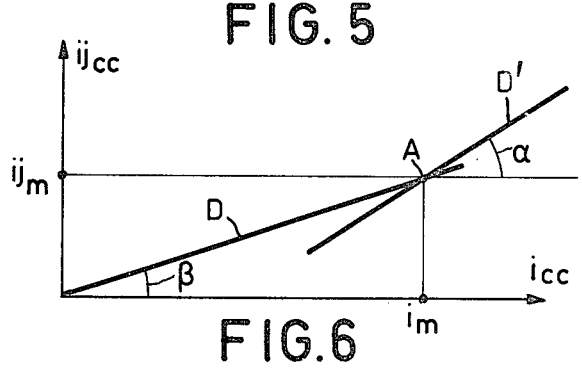
FIG.6

SUBSCRIBER LINE INTERFACE CIRCUIT FOR A TELEPHONE LINE

BACKGROUND OF THE INVENTION

The invention relates to a subscriber line interface circuit for connecting a telephone line to a telephone exchange, the interface circuit comprising a pair of amplifiers which are fed by a d.c. supply source, the outputs of which are connected to the wires of the subscriber's line.

To the telephone line the interface circuit must show an impedance of a certain value, for example, equal to 600 Ohm, it being necessary for the impedance to be balanced relative to ground.

On the other hand, with respect to the direct current supplied to the telephone, in particular subscriber's line, by the supply source, the interface circuit must have a predetermined resistance which, generally, differs from the impedance for the speech signals and which is uniformly distributed over the two terminals of the supply source.

French Patent Application No. 7,731,145 describes a subscriber line interface circuit comprising a pair of amplifiers for feeding the subscriber's line with direct current and control means for these amplifiers for feeding the subscriber's line with an a.c. ringing voltage, without the use of a transformer. In this interface circuit a transformer is used for the transmission of the speech signals.

SUMMARY OF THE INVENTION

It is an object of the present invention to provide a subscriber line interface circuit which, without the use of a transformer, provides a symmetrical termination, having a desired impedance, for the telephone line.

According to the invention, the interface circuit is characterized in that it comprises means for forming a sum current which is equal to the weighted sum of the current through one wire of the telephone line and the current through the other wire of the telephone line with substantially equal weighting coefficients, and being independent of the longitudinal currents in the telephone line, means for forming two voltages which are of the same phase and of the opposite phase with respect to the voltage generated by the said sum current across a load impedance and means for feeding these two voltages back to the inputs of the amplifiers.

In the interface circuit according to the invention, the use of the weighted sum current for forming the two negative feedback voltages, which are applied to the inputs of the amplifiers, makes it possible to obtain certain impedance values of the interface circuit, seen from the telephone line, this impedance being perfectly symmetrical with respect to ground, even in the presence of spurious longitudinal currents generated in the telephone line. Namely, the weighted sum current depends only on the loop current.

When the above-mentioned sum current is applied to a load impedance having the value R, and the two negative feedback voltages are derived from the voltage at the terminals of this impedance, the impedance of the interface circuit, considered from the telephone line, is equal to $2\lambda R$, wherein $\lambda/2$ is the value of the two substantially equal weighting coefficients. By choosing a suitable value for R and $\lambda$ it is possible to obtain a given desired value for the impedance of the interface circuit.

DESCRIPTION OF THE DRAWINGS

The invention will be further explained with reference to the accompanying drawings.

FIG. 2 is an equivalent circuit for the output of the interface circuit.

FIG. 3 is the circuit diagram of a telephone line through which a loop current and spurious longitudinal currents pass.

FIG. 4 is a voltage-current diagram to explain the operation of the interface circuit for direct current and alternating current.

FIG. 5 shows an embodiment of the load impedance.

FIG. 6 is a voltage-current diagram for explaining the operation of the interface circuit when the load impedance, shown in FIG. 5, is used.

PREFERRED EMBODIMENT

Figure 1:
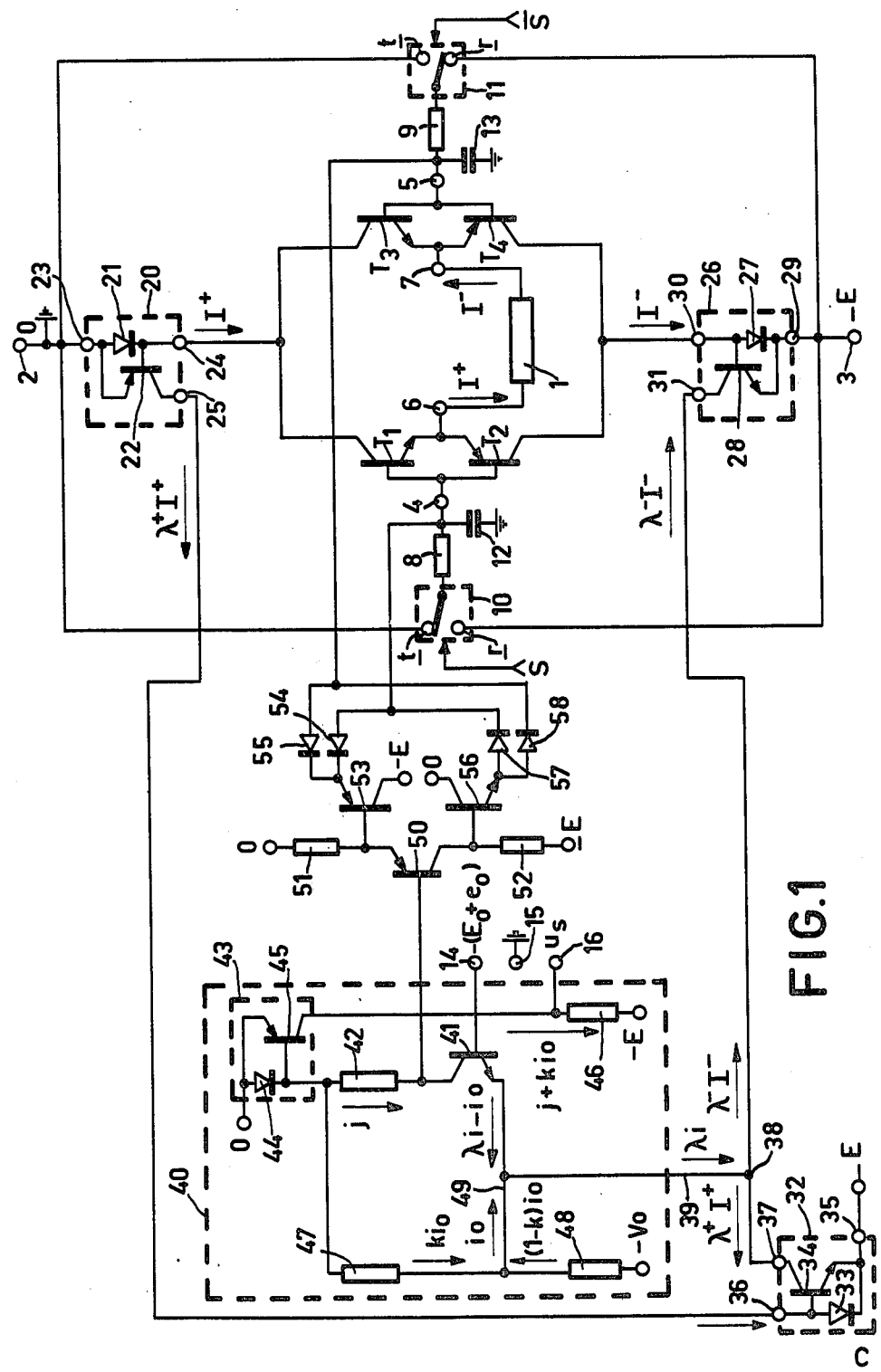
FIG. 1 is a circuit diagram of a subscriber line interface circuit according to the invention.

The subscriber's circuit shown in FIG. 1 must inter alia cater for the direct current supply of the subscribers line interface line 1 from the two terminals 2 and 3 of a direct current supply source. The positive terminal 2 is at zero potential with respect to ground and the negative terminal 3 is at the potential $-E$ (for example $-48$ Volts).

To feed the subscriber's line, this interface circuit utilizes a pair of amplifiers. One amplifier is formed by a pair of complementary transistors ($T_1$, $T_2$) and the other amplifier by the transistors ($T_3$, $T_4$). The bases of the transistors ($T_1$, $T_2$) and of the transistors ($T_3$, $T_4$) are interconnected to form the inputs 4 and 5. The emitters of the above-mentioned transistors are interconnected to form the outputs 6 and 7, which are connected to the wires of the subscriber's line 1. The collectors of the npn-transistors $T_1$ and $T_3$ are interconnected and connected to the positive terminal 2; the collectors of the pnp-transistors $T_2$ and $T_4$ are interconnected and connected to the negative terminal 3.

The inputs 4 and 5 are connected to the supply terminals 2 and 3, respectively, via the input resistors 8 and 9 and the switching circuits 10 and 11, which are controlled by the inverted logic signals S and $\overline{S}$. In the situation shown in the Figure the two transistors $T_1$ and $T_4$ are in the conducting state, the two transistors $T_2$ and $T_3$ are in the non-conducting state and a direct current flows in the subscriber's line 1 from output 6 to output 7. A control of the switching circuits 10 and 11 in the direction opposite to the direction shown in the Figure, causes the direct current in the subscriber's line to flow into the other direction, from the output 7 to the output 6.

The inputs 4 and 5 are further connected to the capacitors 12 and 13. In order to apply a ringing signal to the subscriber's line, the switching circuits 10 and 11 are controlled by signals S and $\overline{S}$, which are obtained by delta-modulation of a sinusoidal signal having the frequency of the ringing signal. The integrating circuits, formed by the resistors 8 and 9 and the capacitors 12 and 13 then supply substantially sinusoidal voltages in antiphase to the inputs 4 and 5 to form the ringing signal on the subscriber's line 1.

The amplifier outputs 6 and 7 form a two-wire entrance for conveying the speech signals into both directions. A four-wire entrance is formed by the terminals 14, 15 and 16, the terminal 15 of which is connected to ground. The voltage $e_o$ which corresponds to the speech signals coming from the telephone exchange and which must be transmitted to the subscriber's line, is applied between the input terminal 14 and the terminal 15. A voltage $u_s$ which corresponds to the speech signals coming from the subscriber's line and which must be transmitted to the telephone exchange, appears between the output terminal 16 and the terminal 15.

The subscriber line interface circuit comprises means for forming a current which is equal to the weighted sum of the current $I^+$, which enters one wire and the current $I^-$, coming from the other wire of subscriber's line 1. The weighted sum current to be formed is written: $\lambda^+ I^+ + \lambda^- I^-$. The weighting coefficients $\lambda^+$ and $\lambda^-$ must then be substantially equal. The value of the weighting coefficients is, for example, equal to 0.1.

Neglecting the base currents of the transistors, the current $I^+$ is the collector current of one of the transistors $T_1$ or $T_3$ ($T_1$ in the Figure) and the current $I^-$ is the collector current of one of the transistors $T_2$ or $T_4$ ($T_4$ in the Figure).

In the embodiment shown in FIG. 1 the weighted sum current $\lambda^+ I^+ + \lambda^- I^-$ is formed by means of circuits which are known as current mirrors. The current mirror 20 consists of a diode 21, which is connected between the base and the emitter of the pnp-transistor 22 in the same direction as the emitter-base diode of this transistor 22. The junction of the emitter of the transistor 22 and the diode 21 is connected to the supply terminal 23 of the current mirror 20, which is connected to the terminal 2 of the supply source. The base of the transistor 22 is connected to the input 24 of the current mirror 20 which is connected to the collectors of the transistors $T_1$ and $T_3$. The collector of the transistor 22 is connected to the output terminal 25 of the current mirror 20. The current $I^+$ appears at the input 24 of the current mirror 20. The current appearing at the output 25 is equal to $\lambda^+ I^+$ when a current ratio is chosen which is equal to the weighting coefficient $\lambda^+$.

The current mirror 26 is formed in an identical manner by means of the npn-transistor 28 and the diode 27. The supply terminal 29 thereof is connected to the terminal 3 of the supply source. The current $I^-$ appears at the input terminal 30 and the current $\lambda^- I^-$ appears at the output terminal 31, if the current ratio is equal to the weighting coefficient $\lambda^-$.

The current mirror 32 is formed by means of the diode 33 and the pnp-transistor 34. The supply terminal 35 is brought to the potential $-E$ of the terminal 3. The current $\lambda^+ I^+$ appears at the input terminal 36, which is connected to output 25 of the current mirror 20. The current ratio of the current mirror 32 is equal to 1, resulting in the current $\lambda^+ I^+$ to appear also at the output terminal 37.

The output 37 of the current mirror 32 and the output 31 of the current mirror 26 are connected to the same point 38 and the weighted sum current $\lambda^+ I^+ + \lambda^- I^-$ is formed on the wire 39, which is connected to the point 38.

Assuming that: $\lambda^+ = \lambda^- = \lambda/2$, the weighted sum current can be written as: $\lambda i$, wherein i is the loop current of the subscriber's line.

This weighted sum current $\lambda i$, flowing through wire 39 is applied to a transformation circuit 40, which is formed in the following manner:

The npn-transistor 41 is connected by means of its base to the input terminal 14 of the four-wire entrance of the interface circuit, its emitter is connected to the wire 39 and its collector to the end of the load impedance 42 which has the value R. This impedance is connected to the input of the current mirror 43, which is formed by means of the diode 44 and the pnp-transistor 45. The supply terminal of the current mirror 43 is brought to zero potential and the output is connected to the output terminal 16 and to the end of the impedance 46, which has the value Z. The other end of the impedance 46 is brought to the potential $-E$ of the supply terminal 3. The input of the current mirror 43 is also connected to the series arrangement of the impedances 47 and 48, having the values Ro and Wo, respectively, the other end of the series arrangement having a negative reference potential $-Vo$. The junction of the resistors 47, 48 is connected to the emitter of the transistor 41 via the wire 49.

The current $i_o$ flowing in the wire 49 is the sum of the current $k i_o$ flowing through the resistor 47 and the current $(1-k)i_o$ flowing through the resistor 48. The emitter current j of the transistor 41 is equal to $\lambda i - i_o$. This current j is substantially the current flowing through the load impedance 42. The current $j + k i_o$ is applied to the impedance 46 by the current mirror 43 with a current ratio equal to 1.

The collector of the transistor 41 is connected to the base of the npn-transistor 50, the collector and the emitter of which are connected to one end of the resistors 51 and 52, which have the same values, the other ends of these resistors being brought to the potentials O and $-E$. The transistor 50 functions as a phase-splitter. An a.c. voltage at the collector of the transistor 41 is transferred with the same phase to the emitter of the transistor 50 and in anti-phase to the collector of the transistor 50.

The potentials at the emitter and the collector of the transistor 50 are transferred to the inputs 4 and 5 of the amplifiers $T_1$-$T_2$ and $T_3$-$T_4$. The emitter of the transistor 50 is connected to the base of the npn-transistor 53, the collector of which is brought to the supply potential $-E$, and the emitter of which is connected to the inputs 4 and 5 via the diodes 54 and 55, respectively, which have the same pass direction as the emitter-base diode of the said transistor 53. The collector of the transistor 50 is connected to the base of pnp-transistor 56, the collector of which is brought to zero potential and the emitter of which is connected to the inputs 4 and 5 via the diodes 57 and 58 which have the same pass direction as the emitter-base diode of the transistor 56.

The diodes 54, 55, 57, 58 are controlled by the d.c. voltages of the inputs 4 and 5. In the position shown in the drawing of the circuits 10 and 11, the diodes 54 and 58 are conducting. In response thereto the potential at the emitter of the transistor 50 is transferred to the input 4 via the diode 54, whereas the potential at the collector of the transistor 50 is transferred to the input 5 via the diode 58.

It will be apparent that the voltage drop $u = Rj$ across the impedance 42 results at the collector of the transistor 41 in a potential $-u$, neglecting the voltage drop in the diode 44, this voltage drop being very small. This potential $-u$ is also found at the emitter of the transistor 50, and this potential is applied to the input 4. The potential $-E + u$, which is found at the collector of the transistor 50 is applied to the input 5.

So, two voltages $-u$ and $+u$, which depend on the current at the output of the amplifiers and which operate as negative feedback voltages, are superimposed via the switching circuits 10 and 11 on the potentials O and $-E$, which have been applied to the inputs 4 and 5.

When the voltage drop in the base-emitter diodes of the transistors $T_1$ and $T_4$ is neglected, the potentials $-u$ and $-E+u$ of the inputs 4 and 5 are transferred to the outputs 6 and 7, as shown by the circuit diagram of FIG. 2. In addition, the resistor W of the subscriber's line and a generator 60 for the a.c. voltage e are connected in this circuit diagram between the terminals 6 and 7, this a.c. voltage e simulating the speech signal produced by the subscriber's set.

Viewed from the subscriber's line towards the terminals 6 and 7, the interface circuit behaves as an impedance $Z_e=(2u/i)$ for the speech signals produced by the subscriber, when only the components resulting from the a.c. voltage e are considered in the voltage drop u and in the current i. In the above-mentioned expression of $Z_e$, u can be represented by $R\lambda i$, so that $$Z_e = 2\lambda R.$$

Assuming the value for R be equal to 3000 Ohm and the coefficient $\lambda$ to have a value of 0.1, the impedance $Z_e$ of the subscriber line interface circuit is then equal to 600 Ohm.

It may happen that the current $I^+$, which enters one wire of the subscriber's line differs from the current $I^-$ coming from the other wire of the subscriber's line. This happens, for example, when cross-talk currents are induced in the subscriber's line by 50 Hz line currents or when the subscriber's line is connected to ground. FIG. 3 shows, between the terminals 6 and 7 of the subscriber's circuit, the resistor W which represents the subscriber's line, a tapping point of this resistor being connected to the ground via a leakage resistance $R_f$.

The current $I^+ - I^-$ flows off via the leakage resistance $R_f$. For the currents $I^+$ and $I^-$ it can be written:

$$\begin{cases} I^+ = I_1 + I_2 \\ I^- = I_1 - I_2 \end{cases} \quad (1)$$

The currents $I^+$ and $I^-$ are formed by a loop current $I_1$, which flows from the terminal 6 to the terminal 7 via the subscriber's loop and by a longitudinal current $I_2$ which is formed by spurious phenomena and is added to or subtracted from the loop current.

In the interface circuit the current $\lambda i$ is obtained from the summation of the two weighted currents $\lambda^+ I^+$ and $\lambda^- I^-$, and by using the equations (1), $\lambda i$ can be expressed by:

$$\lambda i = I_1(\lambda^+ + \lambda^-) + I_2(\lambda^+ - \lambda^-)$$

This last equation clearly shows that, if the two weighting coefficients $\lambda^+$ and $\lambda^-$ are equal, the current $\lambda i$ and, consequently, the voltage $u=\lambda R i$ are independent of the spurious longitudinal current $I_2$ and that they only depend on the loop current $I_1$.

Due to these measures the interface circuit according to the invention has a symmetrical impedance $Z_e=2\lambda R$ between the terminals 6 and 7, no voltage being generated across this impedance by the longitudinal current $I_2$.

A potential $-(E_o+e_o)$, which is obtained from the sum of a bias voltage $-E_o$ and the a.c. voltage $-e_o$, which corresponds to the speech signals coming from the telephone exchange, is applied to the input terminal 14 of the four-wire entrance of the interface circuit.

For the following relations, it being assumed that the transistor 41 is in the conducting state $(j>0)$, the following expressions hold:

$$ki_o = \frac{E_o + e_o}{R_o} \quad (2)$$
$$E_o + e_o - V_o = W_o(1-k)i_o$$
$$j = \lambda i - i_o \text{ where } \lambda i > i_o$$

Taking the two negative feedback voltages, which are applied to the inputs 4 and 5 into account, the equivalent circuit of FIG. 2 then being obtained, it then holds that:

$$E - 2u = Wi + e \quad (3)$$

For the currents and voltages produced in the circuit of FIG. 1 by the variable a.c. voltage $e_o$ coming from the telephone exchange and/or the a.c. voltage e coming from the subscriber's line, the following expressions hold:

$$i_o = \frac{e_o}{\rho} \text{ where } \frac{1}{\rho} = \frac{1}{R_o} + \frac{1}{W_o} \quad (4)$$
$$j = \lambda i - i_o$$
$$u = Rj$$
$$-2u = Wi + e$$

From this it can be derived that:

$$u = \frac{e}{2} \frac{2\lambda R}{W + 2\lambda R} - Ri_o \frac{W}{W + 2\lambda R} \quad (5)$$

When only the a.c. voltage $e_o$ is present, then the voltage v across the subscriber's line is:

$$v = Wi = -2u = Ri_o \frac{2W}{W + 2\lambda R} = R \frac{e_o}{\rho} \frac{2W}{W + 2\lambda R} \quad (6)$$

In order to realize a voltage gain: 1, that is to say $v = e_o \rho$ is chosen so that:

$$\frac{1}{\rho} = \frac{1}{R_o} + \frac{1}{W_o} = \frac{1}{2R} + \frac{\lambda}{W} \quad (7)$$

The voltage e, obtained from the subscriber's line, is measured between the terminals 15 and 16, across the impedance 46 having value Z, through which the current $j+ki_o$ passes.

From the equation (5) it follows that:

$$j = e \frac{\lambda}{W + 2\lambda R} - i_o \frac{W}{W + 2\lambda R} \quad (8)$$

If k is chosen to be:

$$k = \frac{W}{W + 2\lambda R} \quad (9)$$

then current $j+ki_o$ has the value:

$$j + ki_o = \frac{e\lambda}{W + 2\lambda R} +$$

-continued $$i_o\left[\frac{W}{W+2\lambda R} - \frac{W}{W+2\lambda R}\right] = \frac{e\lambda}{W+2\lambda R}$$

and is then independent of $i_o$. Expression (9) is the balance condition of the hybrid network formed by circuit 40.

In these circumstances the variable voltage $u_s$ which appears across the impedance Z has the value:

$$u_s = Z \frac{e\lambda}{W+2\lambda R} \quad (10)$$

In order to realize a voltage gain: 1, that is to say $u_s = u$, the following value is chosen for Z:

$$Z = 2R \quad (11)$$

In practice only an approximation of the equation (9) is possible, as the real value of the impedance W of the line is not known. The value of k will therefore be such that:

$$k = \frac{W'}{W'+2\lambda R} \quad (12)$$

wherein W' is a predetermined value, which is an approximation of the real value W.

The factor k which appears in the circuit of FIG. 1 as the ratio between two currents is obtained by means of a bridge circuit having two impedances 48 and 47 having values which are proportional to W' and $2\lambda R$, respectively.

In the circuit of FIG. 2 these two impedances 48 and 47, having values $W_o$ and $R_o$, can suitably be chosen so that:

$$\begin{cases} W_o = \dfrac{W'}{\lambda} \\ R_o = 2R \end{cases} \quad (13)$$

whereby equation (7) is satisfied.

In practice certain requirements are imposed on the direct current resistance of the interface circuit. For the direct current which flows between the terminals 2 and 3 of the supply source and through the subscriber's line 1, which is connected to the output terminals 6 and 7 of the interface circuit, this subscriber's line must behave as a resistor having a prescribed value $R_{cc}$, for example 300 Ohm, which is divided into two resistors having the value ($R_{cc}/2$) respectively, in series with the terminals 6 and 7.

Assuming the loop-direct current to be $i_{cc}$ then it holds for the d.c. voltage $Y_{cc}$ occurring across the direct current resistance of the interface circuit between the terminals 6 and 7 thereof:

$$Y_{cc} = E - W \cdot i_{cc} = 2u_{cc} \quad (15)$$

In this formula $u_{cc}$ is the d.c. voltage drop across the impedance 42 of the transformation circuit 40.

If the impedance 42 is a resistor having the value R it then holds that:

$$Y_{cc} = 2Rj_{cc} \quad (16)$$

In this formula $j_{cc}$ is the direct current flowing through the transistor 41. The value of this current $j_{cc}$ can be derived from the formulae (2) if in these formulae $e_o$ is assumed to be equal to O.

$$j_{cc} = \lambda i_{cc} - E_o\left[\frac{1}{W_o} + \frac{1}{R_o}\right] + \frac{V_o}{W_o} \quad (17)$$

Assuming that:

$$E_o\left[\frac{1}{W_o} + \frac{1}{R_o}\right] - \frac{V_o}{W_o} = I_{occ} \quad (18)$$

it is obtained that:

$$j_{cc} = i_{cc} - I_{occ} \quad (19)$$

It should be noted that the direct current $j_{cc}$, which flows through the transistor 41 can flow into one direction only, namely into the positive direction, so that the formula (19) can only represent the variations of $j_{cc}$ as a function of $i_{cc}$ for $i_{cc} \geq (I_{occ}/\lambda)$. For $i_{cc} < (I_{occ}/\lambda)$ it holds that: $j_{cc} = 0$.

In accordance with the formula (16) the d.c. voltage drop $y_{cc}$ through the interface circuit is therefore:

$$y_{cc} = 2R(\lambda i_{cc} - I_{occ}) \quad (20)$$

This formula (20) also holds only for the case that $i_{cc} \geq (I_{occ}/\lambda)$, whereas for $i_{cc} < (I_{occ}/\lambda)$ it holds that: $y_{cc} = 0$.

The voltage drop $y_{cc}$ across the subscriber's circuit as a function of the current $i_{cc}$ is represented by the solid curve of FIG. 4, which has a dip at $i_{cc} = (I_{occ}/\lambda)$. Below this value this curve has a angle of inclination $tg\alpha = 2R\lambda$. This angle of inclination $2R\lambda$ corresponds to the impedance of the interface circuit for the alternating current.

When denoting the rated direct current which must flow through the subscriber's line as $i_m$ and the corresponding voltage drop across the direct current resistance of the interface circuit as $y_m$ the equivalent resistance of the interface circuit $R_{cc}$ for the direct current is such that $R_{cc} = tg\beta = (Y_m/i_m)$. At this rated direct current $i_m$ in the subscriber's line the equivalent resistance for direct current of the interface circuit ($y_m/i_m$) can be set, by changing the initial current ($I_{occ}/\lambda$), to a predetermined value without changing the impedance $2R\lambda$ for the alternating currents. In accordance with formula (18) a practical means for controlling the initial current is provided by varying the initial voltage $+V_o$. In the extreme case the initial current can become zero and the equivalent resistance of the interface circuit reaches, for direct current, the maximum value $2R\lambda$, which is equal to the impedance of the interface circuit for the alternating currents.

It should be noted that the direct current resistance, $R_{22}$ of the interface circuit is symmetrical, that is to say longitudinal currents do not generate a voltage thereacross, for the same reasons as given above for the impedance of the interface circuit for the alternating currents. Apparently there is then a resistance ($R_{cc}/2$) in series with each of the outputs 6 and 7.

There are other means to obtain a prescribed value for the direct current resistance of the interface circuit, independent of the alternating current impedance. One of these means consists of the use of an impedance 42 as shown in FIG. 5. This impedance consists of a resistor having a value $R'_o$ which is arranged in series with the parallel arrangement of a resistor having a value $R''_o$ and a choke L.

The choke L can be chosen so that for the speech frequencies $L\omega >> R''_o$, so that the impedance 42 behaves for direct current as a resistor having the value $R'_o$ and for the speech currents as a resistor having the value $R'_o + R''_o$.

When such an impedance network 42 is used, the initial voltage $= V_o$ can be adjusted so that the direct current $I_{occ}$, defined by the formula (18), becomes zero. In accordance with formula (19) the direct current $j_{cc}$ flowing through the impedance 42 is then such that:

$$j_{cc} = \lambda i_{cc}.$$

From the preceding may be derived that the direct current resistance $R_{cc}$ of the interface circuit is equal to $2\lambda R'_o$. As shown in FIG. 6 the d.c. voltage drop $y_{cc}$ is then represented by the straight line D through the zero point with an angle of inclination $\text{tg}\beta = 2\lambda R'_o$.

The impedance of the interface circuit is $2\lambda(R'_o + R''_o)$ for the speech currents. FIG. 6 shows a straight line D' having an angle of inclination $\text{tg}\alpha = 2\lambda(R'_o + R''_o)$ through the point A, which corresponds to the rated direct current $i_m$ in the subscriber's line.

By adjusting $R'_o$ a given value can then be obtained for the direct current resistance and by adjusting $R''_o$ an other, higher value for the impedance for the speech currents.

Figure 7:
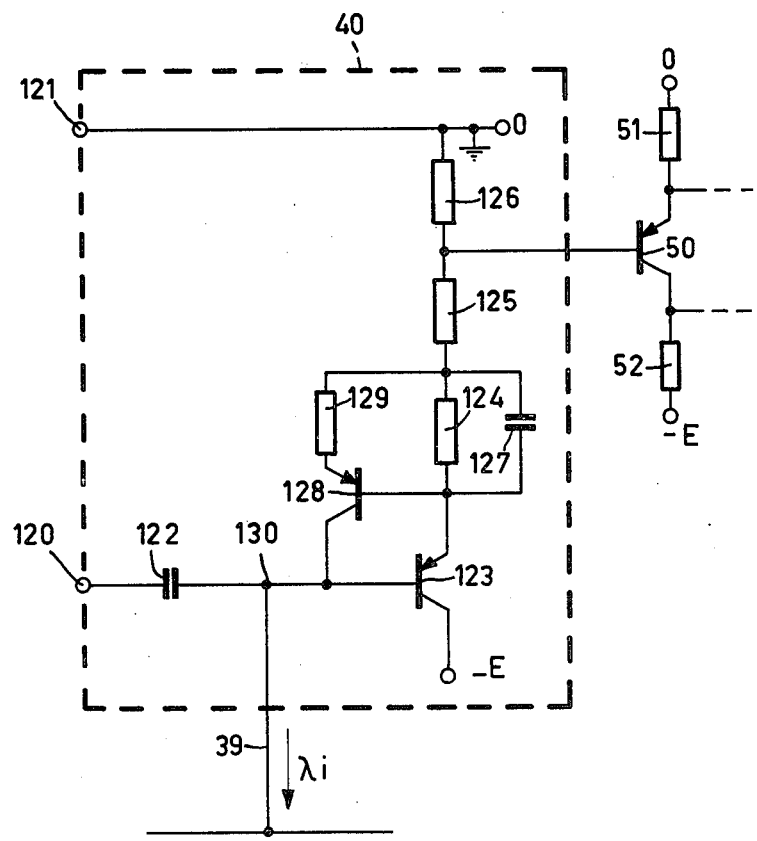
FIG. 7 shows a modified construction of a portion of the interface circuit as shown in FIG. 1, in order to realize a two wire-two-wire junction.

In accordance with a different embodiment of the transformation circuit 40, as shown in FIG. 7, a two-wire entrance 120-121 is formed for connection to the telephone exchange.

The transformation circuit 40 as shown in FIG. 7 comprises a pnp-transistor 123, the base of which is connected to a junction point 130 which is connected to the terminal 120 via the capacitor 122 and to the wire 39 through which the weighted sum current $\lambda i$ passes. The collector of this transistor 123 is connected directly to the negative terminal of the supply source which has the potential $-E$. The emitter of the transistor 123 is connected to the terminal 121 via the series arrangement of the three resistors 124, 125, 126 having the values $R_1, R_2, R_3$, respectively. The mutual junction point of the resistors 125 and 126 is connected to the base of the transistor 50 (FIG. 1). The capacitor 127 is connected to the terminals of the resistor 124. The pnp-transistor 128 is connected by means of its collector to the base of the transistor 123 and by means of its base to the emitter of the transistor 123. The emitter of transistor 123 is connected to the junction point of the resistors 124 and 125 via the resistor 129 having the value $R_4$.

In the transformation circuit 40 constructed thus, the assembly of the elements 123 to 129, inclusive, forms the load impedance for the current $\lambda i$. The two-wire entrance of the interface circuit at the telephone-exchange end, which consists of the two terminals 120, 121, is connected to this load impedance via a by-pass capacitor 122. The voltage across this load impedance is obtained from the combination of the weighted sum current $\lambda_i$ flowing in the wire 39 and the current resulting from the speech signals coming from the telephone exchange, these speech signals being applied between the terminals 120 and 121. In the load impedance thus defined this combined current flows particularly through the resistor 126, and the voltage which appears across this resistor 126 is applied to the base of transistor 50.

Neglecting the d.c. voltage drops formed by the emitter-base diodes of the transistors 123 and 128 and also the base currents of these transistors, the load impedance has the value $R_o$, which is given by:

$$R_o = R_4 + (R_2 + R_3)\left[1 + \frac{R_4}{R_1}\right] \quad (21)$$

when the effect of capacitor 127 is neglected.

The d.c. voltage $u_{cc}$ obtained across the resistor 126 and fed to the base of transistor 50 has the value:

$$u_{cc} = R_3(1 + \frac{R_4}{R_1}) \cdot \lambda i_{cc} \quad (22)$$

wherein $i_{cc}$ is the d.c. voltage component of the current flowing through the interface circuit and in the subscriber's line.

The direct current resistance $R_{cc}$ of the interface circuit is given by:

$$R_{cc} = R_3(1 + \frac{R_4}{R_1}) \cdot \lambda 2 \quad (23)$$

Capacitor 127 prevents the speech currents from flowing through transistor 128. The value of the load impedance for these alternating currents is therefore substantially equal to the input impedance of the transistor 123. If the current gain of the transistor 123 is large, this impedance is very large so that the alternating current component of the weighted sum current $\lambda i$ flows in the impedance of the telephone exchange between the terminals 120 and 121.

If the ratio $(R_3/R_2+R_3)$ has been made equal to $(\lambda/2)$ there are two particularly simple relations between the currents and the voltages of the two two-wire entrances 6-7 and 120-121.

At the two-wire entrance terminals 120 and 121 at the telephone exchange end, the voltage has the value v, and the current entering the interface circuit from the telephone exchange have the value $-\lambda i$. At the two-wire entrance terminals 6 and 7 at the subscriber's line end the voltage has the value $-\lambda v$ and the current entering the interface circuit has the value $-i$, wherein i and v are alternating current quantities.

The relation between the speech voltages and currents at the two pairs of two-wire entrance terminals of the interface circuit is therefore the same as for the case the subscriber's line and the telephone exchange were interconnected via a transformer having the winding ratio: $\lambda$, wherein $\lambda$ can be chosen such that the impedance of the subscriber's line is matched to the impedance of the telephone exchange.

What is claimed is:

1. A subscriber line interface circuit for connecting a subscriber's telephone line to a telephone exchange, the interface circuit including two identical amplifiers, each having an output coupled to a respective wire of said telephone line and an input, said amplifiers further being coupled to a direct current supply source, characterized in that said interface circuit comprises means coupled to said amplifiers for forming a weighted sum current which is equal to the sum of the weighted current flowing to one of the wires of said telephone line and the weighted current flowing from the other of said wires, said weighting being in the form of substantially equal coefficients, means coupled to said current forming means and to said telephone exchange for transforming said weighted sum current into two voltages of opposite polarity, and means coupled to said transforming means for applying said voltages to the respective inputs of said amplifiers.

2. A subscriber line interface circuit as claimed in claim 1, wherein said transforming means includes a load impedance, having a value R equal to that of a given resistor for speech current, through which load impedance said weighted sum current is passed forming a voltage thereacross, and a phase-splitting circuit for receiving said voltage and having an inverting output and a non-inverting output for supplying said voltages of opposite polarity, and wherein said weighting coefficients are substantially equal to $\lambda/2$, the values R and $\lambda$ being chosen so that the quantity $2\lambda R$ is substantially equal to the specified value for the impedance of the interface circuit for speech current as seen from the subscriber's telephone line.

3. A subscriber line interface circuit as claimed in claim 2, characterized in that said load impedance further has the value $R'_o$, $R'_o$ being chosen so that the quantity $2\lambda R'_o$ is substantially equal to the specified value of the resistance of the interface circuit for direct current.

4. A subscriber line interface circuit as claimed in claim 2, wherein said load impedance is a resistor having the value R, characterized in that said interface circuit further comprises means for combining a bias direct current with said weighted sum current flowing through said load impedance.

5. A subscriber line interface circuit as claimed in claim 2, 3 or 4, which further comprises means for causing a first combination current to flow through said load impedance, said combination current being formed by said weighted sum current and a speech current from said telephone exchange.

6. A subscriber line interface circuit as claimed in claim 5, characterized in that said interface circuit further comprises means for applying a second combination current to a given impedance for forming a speech voltage for transmission to said telephone exchange, said second combination current being formed from said first combination current and a portion of said speech current from said telephone exchange.

7. A subscriber line interface circuit as claimed in claim 5, characterized in that said load impedance has two terminals which are the entrance terminals for said telephone exchange thus making a resultant load impedance equal to the parallel combination of said load impedance and the impedance of said telephone exchange, and wherein said interface circuit further comprises means for causing the value of said load impedance to be very high for speech currents with respect to the impedance of said telephone exchange, whereby, for speech currents, the impedance as seen from said subscriber's telephone line is almost equal to $2\lambda$ times the telephone exchange impedance, and means for causing, for speech signals, the ratio of the absolute values of said voltages of opposite polarity applied to said amplifiers, to the voltage appearing across the two terminals of said load impedance, to be equal to $\lambda/2$.

8. A subscriber line interface circuit as claimed in claim 7, characterized in that said means for forming said weighted sum current comprises two current mirror circuits included in the direct current supply circuit for said amplifiers, each of said current mirror circuits having a current ratio equal to said weighting coefficients, and an adding circuit connected to the outputs of said current mirror circuits.

* * * * *

UNITED STATES PATENT AND TRADEMARK OFFICE
CERTIFICATE OF CORRECTION

PATENT NO. : 4,275,277
DATED : June 23, 1981
INVENTOR(S) : GILBERT M.M. FERRIEU

It is certified that error appears in the above—identified patent and that said Letters Patent is hereby corrected as shown below:

On the Title Page under Assignee, change item (73) to read --Telecommunications Radioelectriques et Telephoniques T.R.T., Paris, France--.

Signed and Sealed this

Twentieth Day of April 1982

|SEAL|

Attest:

GERALD J. MOSSINGHOFF

Attesting Officer     Commissioner of Patents and Trademarks